US00RE36855E

United States Patent [19]

Bredahl et al.

[11] E Patent Number: Re. 36,855

[45] Reissued Date of Patent: Sep. 5, 2000

[54] SOLVENTLESS COMPOUNDING AND COATING OF NON-THERMOPLASTIC HYDROCARBON ELASTOMERS

[75] Inventors: Timothy D. Bredahl, Cottage Grove; Harold W. Leverty, Stillwater; Robert L. Smith, New Brighton, all of Minn.; Richard E. Bennett, Hudson, Wis.; David J. Yarusso, Shoreview, Minn.; Daniel C. Munson, St. Paul, Minn.; George E. Cox, Rocheport, Mo.

[73] Assignee: 3M Innovative Properties Company, St. Paul, Minn.

[21] Appl. No.: 09/119,825

[22] Filed: Jul. 21, 1998

Related U.S. Patent Documents

Reissue of:

[64] Patent No.: 5,539,033
Issued: Jul. 23, 1996
Appl. No.: 08/215,212
Filed: Mar. 21, 1994

U.S. Applications:

[63] Continuation-in-part of application No. 07/972,620, Nov. 6, 1992, abandoned.

[51] Int. Cl.[7] ..... C08L 23/00

[52] U.S. Cl. ..... 524/270; 156/289; 156/327; 156/338; 427/208.4; 427/209; 427/505; 427/516; 523/324; 523/348; 524/274

[58] Field of Search ..... 156/289, 327, 156/338; 427/208.4, 209, 505, 516; 524/270, 274; 523/324, 348

[56] References Cited

U.S. PATENT DOCUMENTS

| | | | |
|---|---|---|---|
| 2,199,099 | 4/1940 | Cunningham | 524/575.5 |
| 2,879,547 | 3/1959 | Morris | 428/48.3 |
| 3,565,247 | 2/1971 | Brochman | 428/40.2 |
| 3,592,710 | 7/1971 | Yurgen et al. | 156/153 |
| 3,634,381 | 1/1972 | Lehnerer et al. | 528/481 |
| 3,932,328 | 1/1976 | Korpman | 524/271 |
| 4,028,292 | 6/1977 | Korpman | 524/203 |
| 4,136,071 | 1/1979 | Korpman | 524/534 |
| 4,273,827 | 6/1981 | Sweeney et al. | 428/316.6 |
| 4,415,615 | 11/1983 | Esmay et al. | 428/41.5 |
| 4,431,598 | 2/1984 | Korpman | 264/40.7 |
| 4,497,926 | 2/1985 | Toy | 524/271 |
| 4,536,441 | 8/1985 | Schmeer et al. | 428/317.3 |
| 4,767,813 | 8/1988 | Evitt | 524/271 |
| 4,960,802 | 10/1990 | DiStefano | 521/72 |
| 5,158,725 | 10/1992 | Handa et al. | 264/40.7 |
| 5,252,622 | 10/1993 | DiStefano | 521/65 |

FOREIGN PATENT DOCUMENTS

| | | |
|---|---|---|
| 698518 | 11/1964 | Canada . |
| 0111391 A3 | 6/1984 | European Pat. Off. . |
| 0153042 | 8/1985 | European Pat. Off. . |
| 0567837 A1 | 11/1993 | European Pat. Off. . |
| 0567837A1 | 11/1993 | European Pat. Off. . |
| 1954214 | 3/1971 | Germany . |
| 2935580 C2 | 4/1984 | Germany . |
| 4111739 | 10/1992 | Germany . |
| 50-37692 | 5/1975 | Japan . |
| 53-149234 | 12/1978 | Japan . |
| 55-131072 | 10/1980 | Japan . |
| 57-153032 | 9/1982 | Japan . |
| 58-113280 | 9/1983 | Japan . |
| 58-134172 | 11/1983 | Japan . |
| 60-76583 | 3/1985 | Japan . |
| 60-76584 | 3/1985 | Japan . |
| 6900289 | 6/1970 | South Africa . |
| WO 91/13935 | 3/1990 | WIPO . |
| WO91/13935 | 3/1990 | WIPO . |
| WO 93/07228 | 4/1993 | WIPO . |
| WO93/07228 | 4/1993 | WIPO . |

OTHER PUBLICATIONS

*Handbook of Pressure Sensitive Adhesive Technology,* D. Satas (ed.), p. 268, Van Nostran, N.Y. (1989).

Erwins et al. *Handbook of Pressure Sensitive Adhesive Technology,* "Thermoplastics Rubbers: A–B–A Block Copolymers" D. Satas (ed.), pp. 317–373, Van Nostran, N.Y., 1989.

*Dictionary Rubber* K.F. Heinisch, pp. 359–361, John Wiley & Sons, New York, 1974.

Miller et al. *Journal of Polymer Science,* "Use of Dimaleimides as Accelerators for the Radiaton–Induced Vulcanization of Hydrocarbon Polymers", vol. 58, pp. 737–754, 1962.

Chu, *Handbook of Pressure Sensitive Adhesive Technology,* "Viscoelastic Properties of Pressure Sensitive Adhesive", D. Satas (ed.), pp. 158–203, Van Nostran, N.Y., 1989.

Aubrey, *Rubber Chemistry and Technology, Rubber Reviews,* "The Nature and Action of Tackifier Resins", vol. 61, No. 3, pp. 448–469, Jul.–Aug. 1988.

Schlademan, *Handbook of Pressure Sensitive Adhesive Technology,* "Tackifier Resins", D. Satas (ed.), pp. 527–546, Van Nostran, N.Y. (1989).

Mancinelli, *Adhesives Age,* "Acrylic HMPSA Base Provides Adhesion and Stability Features", pp. 18–23 Sep. 1989.

Ewins et al., *Handbook of Pressure Sensitive Adhesive Technology,* "Thermoplastic Rubbers: A–B–A Block Copolymers", D. Satas (ed.), pp. 317–373, Van Nostran, N.Y. (1989).

*Primary Examiner*—Peter A. Szekely
*Attorney, Agent, or Firm*—Doreen S. L. Gwin

[57] ABSTRACT

A solvent-free hot melt process, for preparing a non-thermosettable, pressure-sensitive adhesive from a tackified non-thermoplastic hydrocarbon elastomer. The process employs a continuous compounding device that has a sequence of alternating conveying and processing zones. The processing zones masticate and mix materials in them. Non-thermoplastic elastomers having high molecular weight may be readily compounded into adhesives in the process.

40 Claims, 3 Drawing Sheets

SOLVENTLESS COMPOUNDING AND COATING OF NON-THERMOPLASTIC HYDROCARBON ELASTOMERS

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of [copending] application Ser. No. 07/972,620, filed Nov. 6, 1992, *now abandoned.*

FIELD OF THE INVENTION

This invention relates to a solvent free, hot melt process for the manufacture of a non-thermosettable, pressure sensitive adhesive (PSA) from a tackified, non-thermoplastic hydrocarbon elastomer.

BACKGROUND OF THE INVENTION

Pressure sensitive adhesives based on non-thermoplastic hydrocarbon elastomers such as natural rubber, butyl rubber, synthetic polyisoprene, ethylene-propylene, polybutadiene, polyisobutylene, or styrene-butadiene random copolymer rubber, are well known in the art. The dominant means of processing such adhesives comprises masticating the elastomer on a two roll mill or in a Banbury type internal mixer, dissolving the elastomer and other adhesive components in a hydrocarbon solvent, coating the solution onto a backing, and drying the coated product to remove the solvent. This technology is discussed in Handbook of Pressure Sensitive Adhesive Technology, D. Satas (ed.), p. 268. Van Nostrand, N.Y., (1989). The solvent process has the disadvantages of being labor intensive, having low production rates, and emitting large amounts of potentially hazardous solvents to the atmosphere thereby requiring expensive equipment for solvent recovery and/or incineration. Moreover, such solvent based processes have become increasingly undesirable for use in making adhesive tapes because of increasing environmental and safety regulations throughout the world.

A processing method, sometimes used when a relatively thick adhesive layer is desired, comprises masticating the elastomer as described above, blending the rubber and other adhesive components in an internal mixer such as a Banbury mixer, and calendering the solid adhesive onto a backing using a three or four roll calender stack. The calendering process does not use solvent but does require very expensive equipment. Additionally, this process is slow, and is only economical when adhesive coatings greater than about 2 mils (51 $\mu$m) thick are desired. An application of the calendering process is discussed in U.S. Pat. No. 2,879,547 to Morris.

Environmental considerations, lower initial capital investments, potentially higher production rates, and lowering processing costs have led to accelerated interest in the use of continuous hot melt compounding and extrusion coating of thermoplastic adhesive compositions. The elastomers employed in this technique are "thermoplastic" elastomers of the block copolymer type, including for example, styrenic-diene block copolymers. Such materials exhibit a sharp reduction in viscosity at temperatures above 100° C. where the styrene domains soften. Upon cooling, the domains reform and the material regains its rubbery character and cohesive strength. Illustrative teachings of adhesive formulations and processes of this type are found, for example, in U.S. Pat. No. 3,932,328 to Korpman, U.S. Pat. No. 4,028,292 to Korpman, and U.S. Pat. No. 4,136,071 to Korpman. The technology is further discussed in Handbook of Pressure Sensitive Adhesive Technology, pp. 317–373, D. Satas (ed.), Van Nostrand, N.Y., (1989).

Hot melt pressure sensitive adhesives based on these thermoplastic elastomers have found wide acceptance in the packaging, label, and diaper closure markets, but limited acceptance for use in paper masking tapes. The adhesive properties of pressure sensitive adhesives made from these thermoplastic elastomers differ from those of adhesives based on non-thermoplastic hydrocarbon elastomers, and are undesirable for many tape applications.

Because of their unique properties, non-thermoplastic hydrocarbon elastomer based adhesive systems, especially those employing natural rubber, are likely to be retained for many applications for which the thermoplastic elastomer systems are not adequate. Consequently, there is a need to provide a method of making adhesives from these non-thermoplastic elastomers which is environmentally appropriate, economically viable, and energy conserving.

Hot melt extrusion of pressure sensitive adhesives employing non-thermoplastic hydrocarbon elastomers such as natural rubber has been shown. However, low molecular weight plasticizing aids such as processing oils, elastomer oligomers, waxes, or other materials defined and described as plasticizers in Dictionary of Rubber, K. F. Heinisch, pp. 359–361, John Wiley & Sons, N.Y., (1974), are used as major components in the adhesive formulations. These plasticizing aids ease processing but detract from the ability of the finished adhesive to sustain a load and are generally known in the art to degrade adhesive performance.

Canadian Patent No. 698,518 to P. Beiersdorf & Co., discloses a solventless extrusion coating process for coating a PSA composition based on non-thermoplastic elastomers including natural and synthetic rubber, high molecular weight polyisobutylene and polyvinyl ether. The elastomer is pre-masticated and blended in a separate, batchwise operation using conventional rubber processing equipment such as a two-roll mill or a Banbury mixer. The preformed, compounded mixture is then fed to a heated single screw extruder and the molten coating is extruded onto a moving web. Plasticizing aids comprising up to 54% of the formulation are used. It is believed that these plasticizing aids are used to accommodate the coating difficulties normally associated with the extrusion of high viscosity elastomers.

Japanese patent application Shou 50-37692 to Fukugawa et al discloses a similar process of pre-masticating mixtures of ingredients of pressure sensitive adhesives for 25 minutes, supplying the premasticated mixtures to a heated extruder, extruding the materials at 230° C. onto a substrate, and curing the extruded materials by exposing them to electron beam radiation to enhance the cohesive strength of the adhesive and improve the bond to the backing. This work describes a narrow range of materials including the non-thermoplastic elastomers natural rubber and styrene-butadiene rubber (SBR). In the two examples utilizing natural rubber, the natural rubber was blended with a styrene-butadiene elastomer and a plasticizing aid. The plasticizing aid equalled about 87.5% of the total rubber charge, and no tackifier resins were used. The non-natural rubber example included 25.8% plasticizing aid.

German provisional patent publication P-19 54 214.4 to Pyton AG discloses an extrusion process for the preparation of pressure sensitive adhesives which does not necessitate a separate pre-mastication step. A twin screw extruder is used to continuously compound and coat a formulation comprised of five different types of materials. Natural rubber and/or partially vulcanized rubber, latex, polybutene with a molecular weight between 70,000 and 200,000, and polyisobutylene with a molecular weight between 100,000 and 250,000 comprise the "cohesive component". Four other classes of ingredients are required to accommodate this process. These other ingredients include low molecular weight (less than 15,000) polybutene and polyisobutylene or native bitumen, reactive and/or non-reactive resins, antioxidants, and various metal oxide fillers. No specific compositions are taught, but the levels of plasticizing aids such as bitumen, or the low molecular weight polyisobutylene or polybutene are reported to range from 10–20%.

U.S. Pat. No. 2,199,099 to Cunningham discloses that air and oxygen enriched gases can be used to facilitate the oxidative breakdown of natural rubber in an internal mixer to reduce the molecular weight of the rubber. A continuous hot melt extrusion process that employs the air-assisted oxidative break-down of natural rubber followed by the addition of tackifiers and phenolic resin vulcanizing agent to form a thermosettable adhesive is known. In this process the molecular weight of the natural rubber is reduced to such a degree that when the phenolic resin is added, the combination of the rubber and resin can be processed at a temperature below that at which vulcanization occurs.

The hot melt extrusion of non-thermoplastic hydrocarbon elastomers has not proven to be a commercially practical method of making pressure sensitive adhesives having the properties needed for PSA tapes, such as masking, packaging and medical tapes. Furthermore such process technology is not envisioned for sustaining the dominant position of natural rubber elastomer, the single largest use of non-thermoplastic hydrocarbon elastomers for these PSA tapes. According to the Handbook of Pressure Sensitive Adhesive Technology, solvent and/or water coating of PSA adhesives are the only practical techniques for making such tapes, especially when the PSA's are based upon high molecular weight hydrocarbon elastomers. As discussed above, these techniques are not entirely satisfactory. Thus, it would be desirable to provide a practical method of compounding non-thermoplastic hydrocarbon elastomers as molecular weights and compositions of interest to the PSA industry.

SUMMARY OF THE INVENTION

A process has been discovered which overcomes the disadvantages of the prior art and permits the processing of non-thermoplastic hydrocarbon elastomers, especially high molecular weight non-thermoplastic hydrocarbon elastomers, without the need to employ either organic solvents or low molecular weight plasticizing aids.

The present invention comprises a process for the solvent free compounding of non-thermosettable PSAs based upon a tackified non-thermoplastic hydrocarbon elastomer. The process employs a continuous compounding device and hot melt processing techniques. The adhesive composition can be compounded without separate batch pre-mastication of the elastomer and without the use of significant amounts of plasticizing aids to reduce the viscosity of the composition to render it processable. Additionally, the adhesive composition can be applied to a moving web directly from the compounding device so as to provide a continuous method for the manufacture of a PSA tape.

The process of the invention can accommodate even high molecular weight hydrocarbon elastomers, for example viscosity average molecular weight ($\overline{M}_v$) of 250,000 or more. As discussed above, it has been previously thought that such elastomers could only be compounded and applied if solvent or water processing techniques were utilized or if significant amounts of low molecular weight plasticizing aids were employed.

The process can employ either aerobic or anaerobic processing. For purposes of this invention, aerobic processing means that gas which contains available oxygen (such as compressed air) is intentionally injected into the compounding device so as to promote oxidative breakdown of the hydrocarbon elastomer. Anaerobic processing means that no oxygen-available gas is intentionally injected into the compounding device. However, minor amounts of air may be present in anaerobic processing in the practice of the invention.

Aerobic processing may be advantageously utilized when the hydrocarbon elastomer will preferentially undergo chain scission rather than crosslinking and/or chain extension. Aerobic processing allows a greater reduction in the molecular weight of the elastomer in a relatively short period of time. Additionally, aerobic processing allows manufacture at lower temperatures. As a result, thermally sensitive materials may be compounded with the hydrocarbon elastomer in the process of the invention.

Anaerobic processing may be advantageously utilized when elastomers which crosslink under oxidative conditions were used. This mitigates the problem of these elastomers crosslinking during processing. Anaerobic processing may also be used with elastomers that do not crosslink under oxidative conditions so as to achieve a higher molecular weight than would be achieved under aerobic conditions. This increases the cohesive strength of the adhesive and minimizes the degree of later crosslinking needed to provide enhanced cohesive strength. Anaerobic processing of either type of elastomer also results in adhesives having lower odor and lighter color.

The practice of the invention employs a continuous compounding device that has a sequence of alternating conveying and processing zones. The elastomer is continuously conveyed from one zone to the other by the device. The processing zones are capable of masticating the elastomer. They are also capable of mixing additives into the elastomer.

In the process, a non-thermoplastic elastomer is fed to a first conveying zone of the compounding device. This first zone transports the elastomer to a first processing zone where the elastomer is masticated. The masticated elastomer is then transported to a second conveying zone where a tackifier is added and the mixture of the two is carried to a second processing zone where the tackifier and the masticated elastomer are mixed together to form a blend of the two materials. The blend can then be discharged from the compounding device and stored for later use. Another aspect of the invention comprises a novel product and process that involves the use of small amounts of chemical "blowing" or "foaming" agents that liberate gas upon thermal decomposition and create a cell structure within the adhesive mass. The cell structure in the adhesive changes the adhesive topography, density, compressibility, and conformability to allow tape made with this adhesive to display instant adhesion, or "quick stick", properties superior to those exhibited by the thinner, unfoamed extruded adhesive and comparable to foamed adhesives prepared by solvent evaporation.

This aspect of the invention overcomes the problems typically encountered with extruded adhesives. These problems are caused by the higher densities and smooth, non-extensible surfaces of extruded adhesives which result in comparatively poor "quick stick" properties. In this aspect of the invention, a tackifier is an optional, although preferred ingredient. Alteratively, the blend cart be applied to a web, preferably a moving web, in the form of a thin film.

In order to facilitate the description of the invention, the following terms used herein shall have the following meanings.

Non-thermosettable PSA shall mean a PSA which does not go to a relatively infusible and tack free state upon exposure to heat.

Non-thermoplastic hydrocarbon elastomer shall mean a hydrocarbon homopolymer or copolymer as distinguished from a block copolymer.

Pressure sensitive adhesive shall mean an adhesive which is normally tacky at room temperature and adheres to a surface upon mere contact to the surface without the need for more than finger or hand pressure.

Tackifier shall mean a material which is miscible with at least one hydrocarbon elastomer employed in the process, has a number average molecular weight $\overline{M}_n$ of 10,000 grams per mol (g/mol) or less and a glass transition temperature ($T_g$) of −30° C. or more as measured by differential scanning calorimetry (DSC).

Plasticizing aid shall mean a material which has a $\overline{M}_n$ of less than 50,000 g/mol and a ($T_g$) of less than −30° C. as measured by DSC.

DETAILED DESCRIPTION OF THE INVENTION

Figure 1:
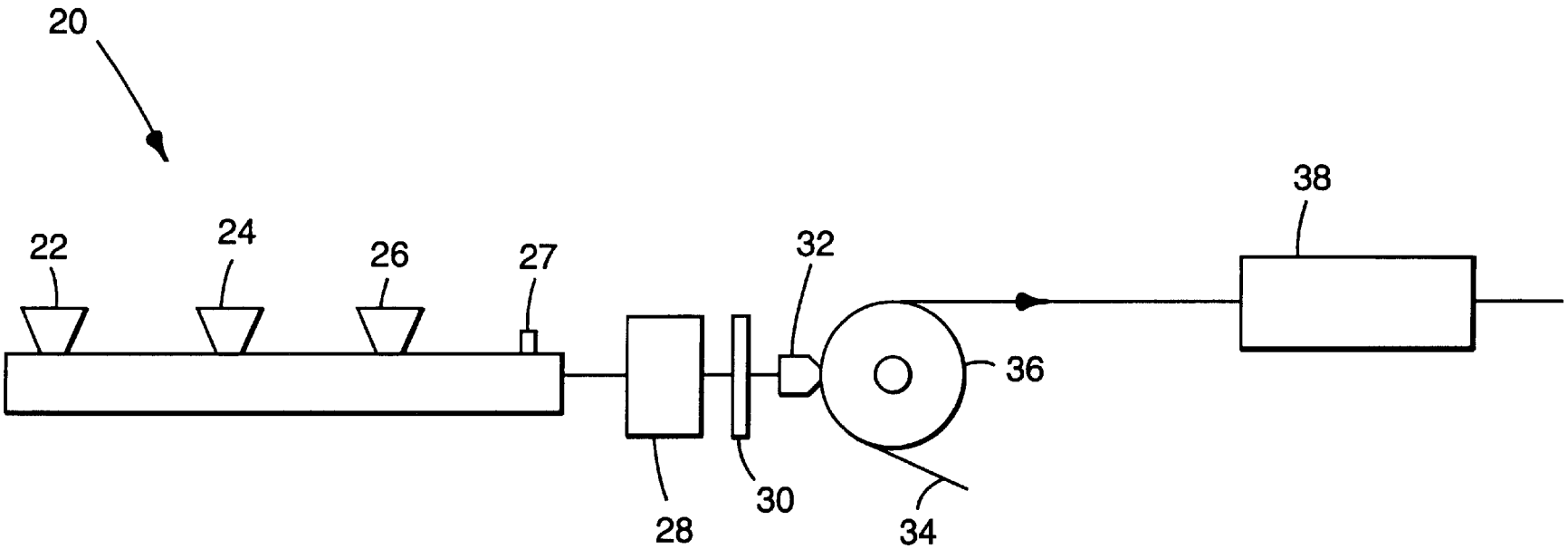
FIG. 1 is a schematic representation of a continuous compounding and coating line useful in the practice of the invention.

The process of the invention employs a continuous compounding device. A number of such devices are known. They may comprise a single unit or a series of units interconnected so as to continuously process the elastomer. The device has a sequence of alternating conveying and processing sections which are interconnected. An example of a continuous compounding device useful in the present invention is a twin screw extruder having a sequential series of conveying and processing zones. A plurality of input openings are provided along the length of the extruder to facilitate the addition of various materials such as tackifier resins, fillers, antioxidants, plasticizing aids (if desired), radiation enhancers such as electron beam sensitizers and photoinitiators, and other adjuvants known in the art. Additions of material, whether elastomer, tackifier, or other adjuvants, are made through input ports to a partially full conveying zone or [zones] *section*. A melt pump and filter may be present either as an integral part of the extruder, or as a separate unit to facilitate both the removal of the adhesive from the compounding device and the removal of unwanted contaminants from the adhesive stream.

In the practice of the process, the elastomer is added to a first conveying zone of the compounding device at a controlled rate so that the elastomer does not completely fill the zone. The elastomer may be pelletized by grinding or extrusion pelletization prior to being fed to the compounding device. Alternately, it may be fed directly into the compounding device without grinding or pelletizing using a device such as a Moriyama extruder. If the elastomer has been pelletized, it is preferably treated with a material such as talc to prevent agglomeration of the pellets.

The elastomer is then transported by the first conveying zone to a first processing zone where it is masticated. The first processing zone typically is designed to be essentially completely full and to masticate the elastomer. Additionally, the processing zone conveys the elastomer to the next zone. It may be desirable to provide the first processing zone as at least two discrete processing sections separated from each other by a transporting section. This permits the elastomer to be masticated in steps, with cooling of the masticated elastomer between each step.

If two or more elastomers are to be processed in the invention, they may both be added to the first conveying zone and masticated in the first processing zone. Alternatively, the elastomers may be added sequentially to different conveying zones with sequential mastication after each elastomer addition. Sequential elastomer addition to different conveying zones may also be employed when a single elastomer is used.

If aerobic processing is desired, a gas containing available oxygen, such as compressed air, can be readily injected into the compounding device. Preferably air is injected into either a transporting section, or a conveying [zone] *section* situated between two processing [zones] *sections*. Alternatively, the gas can be injected into any processing or conveying [zone] *section*. If the gas comprises compressed air, it is typically injected into the compounding device at a pressure of from 5 to 100 pounds per square inch gauge (psig) (30–700 kilopascals (kPa)). Table I illustrates the relationship between air pressure and inherent viscosity for a smoked sheet natural rubber.

TABLE I

| Compressed Air Pressure | | Flow Rate | | |
|---|---|---|---|---|
| (psig) | (kPa) | SCFM | L/hr. | IV |
| 60 | 414 | 35 | 992 | 1.59 |
| 45 | 310 | 35 | 992 | 1.64 |
| 30 | 207 | 35 | 992 | 1.73 |
| 20 | 138 | 35 | 992 | 1.71 |
| 10 | 69 | 35 | 992 | 1.81 |
| 0 | 0 | 35 | 992 | 1.82 |

The natural rubber was masticated in the extruder used in Example 19. The screw speed was 180 rpm. The melt temperature was maintained at 163° C. throughout the extruder. Air was injected and bled from [zone] *section* 3 of the [extruder] *screws shown in FIGS. 3 and 4*. The rubber was fed to the [extrudate] *extruder* at a rate of 57.8 kg/hr. A flow meter may be used to regulate the air flow to the compounding device. Additionally, a pressure control valve may be used to build or release air pressure in the extruder.

Mastication is preferably carried out in the absence of materials which will lubricate the elastomer and prevent reduction of its molecular weight. This does not however, preclude the presence of small amounts of such materials, provided that the amount present does not effectively reduce the rate of mastication. Certain other solid adjuvants, such as talc, inorganic fillers, antioxidants, and the like, may be fed to the compounding device such that they are present during mastication.

The masticated elastomer then passes from the first processing zone to a second conveying zone. As with the first conveying zone, the second conveying zone is not completely filled by the elastomer. Tackifier, and optionally other additives, are fed to the second conveying zone. The resulting mixture is conveyed to the next processing zone where they are mixed to form a blend of the materials. A number of techniques may be used to feed these materials to the compounding device. For example, a constant rate feeder such as a K-Tron loss-in-weight feeder may be used to add solid materials. Heated pail unloaders, gear pumps, and other appropriate equipment for feeding liquids at a controlled rate may be used to feed the liquids to the compounding device. Additives present at low concentration may be pre-blended with one or more of the other components for more accurate addition.

Although substantially all mastication occurs in the first processing zone, there may be some mastication which occurs in subsequent processing of the elastomer through the compounding device. This additional mastication may occur in subsequent conveying or processing zones. In any event, the degree to which the elastomer must be masticated in the practice of the invention varies with each elastomer employed and the finished product desired. Generally, the elastomer must be sufficiently masticated to (i) permit subsequently added tackifiers and any other adjuvants to be satisfactory mixed into the elastomer to form a blend and (ii) to permit the blend to be extruded as a stream that is essentially free from both rubber particles and from visually identifiable regions of unmixed tackifier and any other adjuvants.

Once the masticated elastomer, tackifier, and any other adjuvants have been formed into the blend, the composition may now be referred to as an adhesive. This adhesive typically has a viscosity at the processing temperature in the range from 500 Poise to 5000 Poise (measured at a shear rate of 1000 $sec^{-1}$). Higher viscosity adhesives may also be processed in the process of the invention. The processing temperature of the adhesive is typically in the range of 100°–200° C.

The adhesive may be discharged from the compounding device into a storage container for later additional processing or use. Alternatively, it may be discharged directly onto a support in the form of a thin film. Preferably, the support comprises a moving web. The thin adhesive film may be formed by pumping the adhesive through a coating die, optionally with the aid of a gear pump or other suitable device to develop sufficient pressure. The die is preferably of the contacting variety (i.e. not a drop die) which smears the adhesive onto a moving web supported on a backup roll. The die may have a flexible blade, a cylindrical rubber wipe, or a rotating cylindrical metal rod on the downstream side of the die opening to spread the adhesive. The die may be located at the output of the compounding device to allow coating in-line with the compounding and extruding operations. Alternatively, the adhesive may be discharged from the compounding device and fed to the coating die using a separate extruder, melt pump, or combination of extruder and melt pump with sufficient pressure to force the adhesive mixture through the die. The adhesive may optionally be filtered prior to feeding to the coating die.

The coated adhesive may optionally be crosslinked by exposure to radiation, such as electron beam or ultraviolet radiation, to enhance the cohesive strength of the material. Crosslinking may be carried out in-line with the coating operation or may occur as a separate process. The degree of crosslinking achieved is a matter of choice and is dependent upon a number of factors such as the end product desired, the elastomer used, the thickness of the adhesive layer, etc. Techniques for achieving crosslinking via exposure to radiation are known to those of skill in the art.

A release coating may also be optionally applied to the web, either before or after application of the adhesive. The release coating may be continuous or discontinuous on the web and is normally on the surface of the web opposite that which ultimately bears the adhesive. The release coating may be applied either in-line with the coating or crosslinking operations, or as a separate process.

A twin screw extruder is preferably used as the compounding device in the invention. The extruder screw should be configured to masticate the elastomer in the first processing zone prior to addition of the tackifier. Additionally, if a blend of elastomers is used in the adhesive, the first processing zone preferably allows mastication and blending of the elastomer components. The portion of the extruder and screw following the first processing zone must be designed to permit the addition of the tackifier and other additives to the elastomer and good mixing of the elastomer with these materials. Preferably, the screw is designed so that a homogeneous adhesive composition results.

The design of the screw to achieve mastication, conveying and blending follows normal practices known in the art. Namely, the screw has a sequence of conveying and processing zones. Flow restriction and mixing elements are provided so as to achieve appropriate flow along the screw and obtain appropriate mastication and mixing. The conveying zones may contain ordinary Archimedes screw elements. The processing zones *may include both conveying sections and processing sections which* may contain kneading blocks, pin mixers, or other elements designed for mastication, compounding and mixing. Flow restriction elements, such as kneading blocks arranged with a reverse pitch, reverse pitched conveying screws, a disk element or other device designed to restrict the flow of material, may also be present in the processing zone *or section* to ensure that the portion of the processing zone *or section* preceding these elements tends to run full of material while the conveying zone *or section* following them tends to run only partially full.

A wide variety of non-thermoplastic hydrocarbon elastomers can be employed in the present invention. These materials may be used singly or blended together in the practice of the invention. Examples of these elastomers include, natural rubber, butyl rubber, synthetic polyisoprene, ethylene-propylene rubber, ethylene-propylene-diene monomer rubber (EPDM), polybutadiene, polyisobutylene, poly (alpha-olefin) and styrene-butadiene random copolymer rubber. These elastomers are distinguished from thermoplastic elastomers of the block copolymer type such as styrenic-diene block copolymers which have glassy end blocks joined to an intermediate rubbery block.

Tackifiers useful in the invention preferably have a low molecular weight relative to the hydrocarbon elastomer, and a Tg higher than that of the hydrocarbon elastomer.

Examples of useful tackifiers include rosin and rosin derivatives, hydrocarbon tackifier resins, aromatic hydrocarbon resins, aliphatic hydrocarbon resins, terpene resins, etc. Typically the tackifier comprises from 10 to 200 parts by weight per 100 parts by weight of the elastomer.

When a foamed adhesive is desired, the blowing agent is added to the elastomer at a temperature below that of the decomposition temperature of the blowing agent. It is then mixed at such a temperature to distribute it throughout the elastomer in undecomposed form. Preferably the blowing agent comprises from 0.5 to 5 weight percent of the adhesive layer. However, lesser or greater amounts may be utilized if desired.

Useful blowing agents typically decompose at a temperature of 140° C. or above. Examples of such materials include synthetic azo-, carboante-, and hydrazide-based molecules. Specific examples of these materials are Celogen™ OT (4,4' oxybis (benzenesulfonylhydrazide), Hydrocerol™ BIF (preparations of carbonate compounds and polycarbonic acids), Celogen™ AZ (azodicarboxamide) and Celogen™ RA (p-toluenesulfonyl semicarbazide).

Once dispersed, the blowing agent may be activated after extrusion by, for example, heating the extrudate to a temperature above its decomposition temperature. Decomposition of the blowing agent liberates gas, such as $N_2$, $CO_2$ and/or $H_2O$, and creates cell structure throughout the adhesive mass. Decomposition may be done before or after the adhesive is cured.

A number of adjuvants may also be used in the adhesive. Examples of such adjuvants include antioxidants, such as hindered phenols, amines, and sulphur and phosphorous hydroperoxide decomposers; inorganic fillers such as talc, zinc oxide, titanium dioxide, aluminum oxide, and silica, plasticizing aids such as those materials described as plasticizers in the Dictionary of Rubber, K. F. Heinisch, pp. 359, John Wiley & Sons, N.Y. (1974), oils, elastomer oligomers and waxes; and the like. Typically the antioxidant comprises up to 5 parts by weight per 100 parts by weight elastomer, the inorganic filler comprises up to 50 parts by weight per 100 parts by weight of elastomer, and the plasticizing aids up to 10 percent by weight of the total adhesive. If a plasticizing aid is used it should not exceed 10 percent by weight of the total adhesive composition. Preferably, it comprises from 0 to about 8.5 percent by weight of the adhesive composition and more preferably less than 10% by weight of the elastomer. The plasticizing aid may be incorporated prior to, during, or after the mastication of the elastomer. Whenever it is added, it should not prevent effective mastication of the elastomer. Preferably, the use of plasticizing aids is unnecessary.

A number of organic and inorganic materials may be used as the web in the practice of the present invention. Such materials include polymeric films, metallic foils, paper, ceramic films, and the like. Furthermore, the web may comprise a plurality of fibers in a mat-like construction. The fibers may be combined to form either a woven or a non-woven (i.e., randomly arranged collection of fibers) web.

Virtually any PSA tape can be made by the process of the invention. Examples of such tapes include masking tape, packaging tape (such as box sealing and strapping tapes), decorative tape, protective tape and film, label stock, diaper closure tape, medical tape (such as hospital and athletic tapes), etc. Additionally, the process can be used to make any article having a layer of a hydrocarbon elastomer-based PSA on a backing.

This invention is illustrated by the following examples, but the particular materials and amounts thereof recited in these examples, as well as other conditions and details should not be construed to unduly limit this invention.

Figure 2:
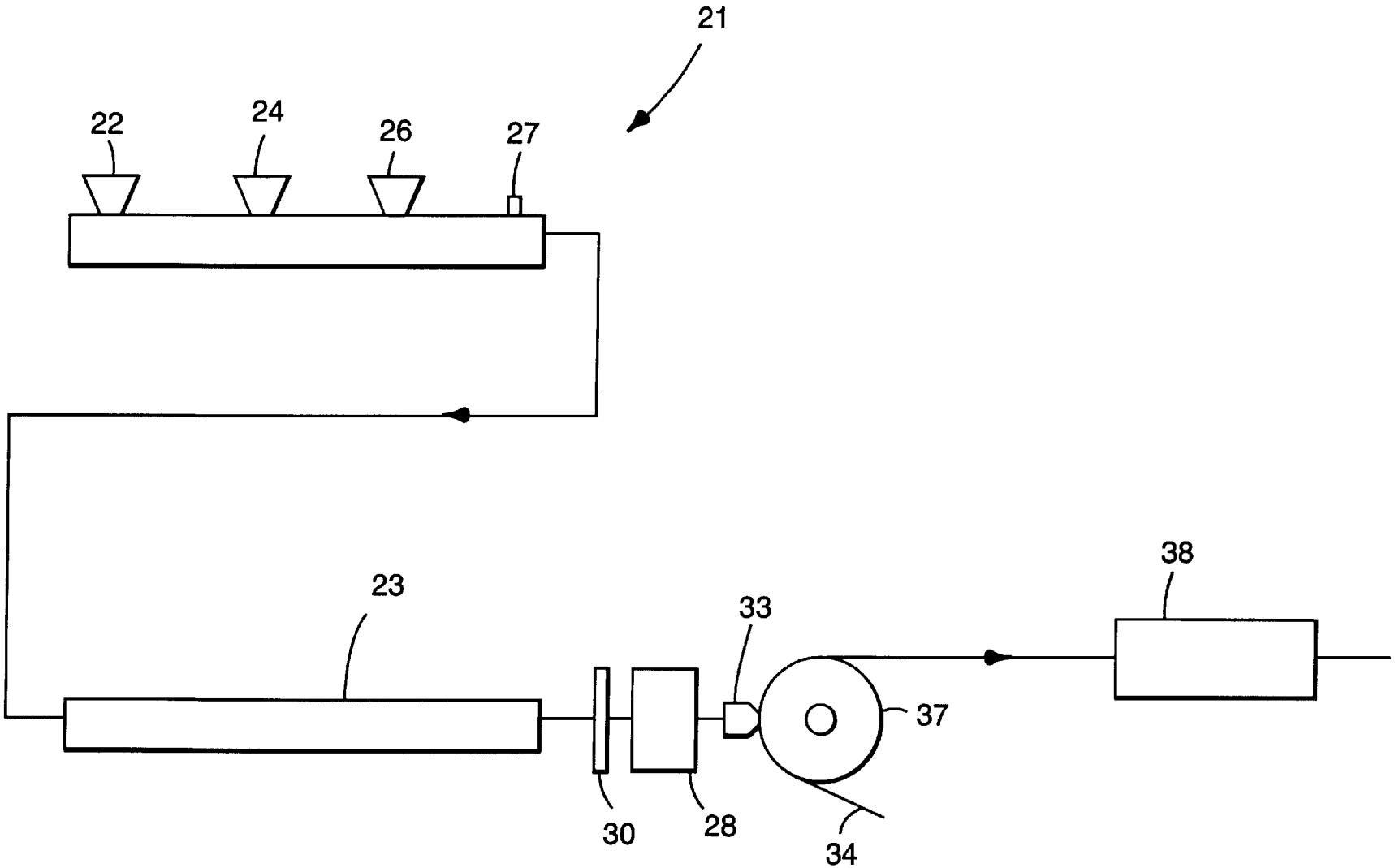
FIG. 2 is a schematic representation of an alternative continuous compounding and coating line useful in the practice of the invention.
Figure 4:
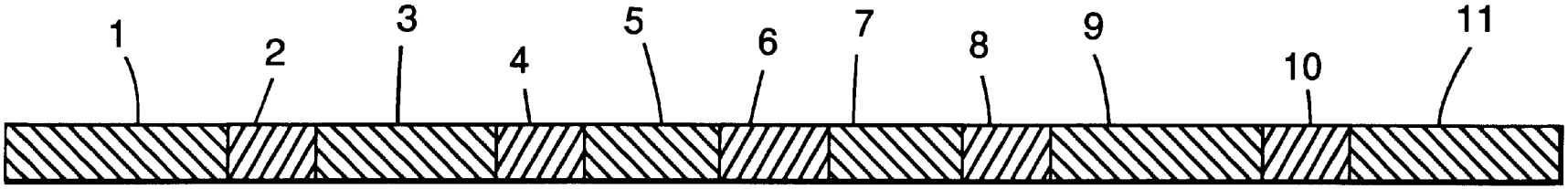
FIG. 4 is a schematic representation of the extruder screw design employing 11 [zones] *sections*.
Figure 3:
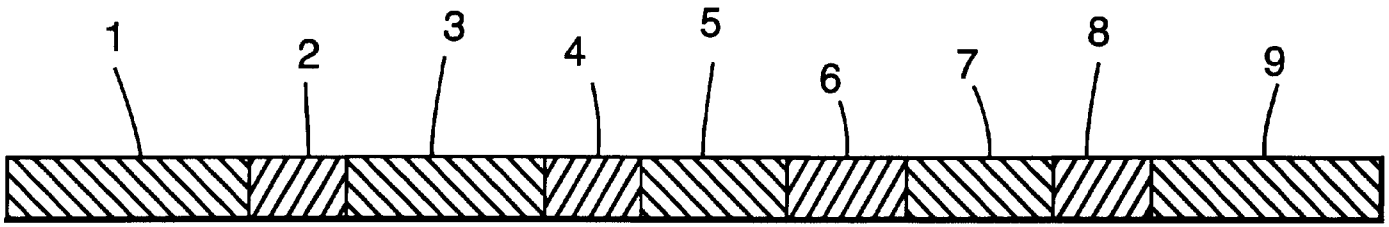
FIG. 3 is a schematic representation of the extruder screw design employing 9 [zones] *sections*.

A schematic representation of a continuous compounding, coating and crosslinking equipment configuration of the type used in the invention is shown in FIGS. 1 and 2. The configuration represented by FIG. 1 was used in Examples [1–13] *1–16 and 20–23*. The configuration represented by FIG. 2 was used in Examples [14–19] *17–19*. Various screw configurations were used throughout the examples. FIG. 3 is a schematic representation of the screw used in Examples 1–18 *and 20–23*. FIG. 4 is a schematic representation of the screw used in Example 19.

The compounding device employed in both FIGS. 1 and 2 was a Werner-Pfleiderer co-rotating twin screw extruder 20 *and 21*. A model ZSK-30 extruder was used in Examples 1–16 *and 20–23*. A model ZSK-90 extruder was used in Examples 17–19. The extruders 20 and 21 were equipped with an elastomer feed hopper 22 and solids feed hoppers 24 and 26. Feed hoppers 22, 24 and 26 controlled the rate of material delivered to the extruders 20 and 21 by continuously monitoring the weight of material in the feed hopper. A vent 27 was provided near the discharge end of each of the extruders 20 and 21.

With reference to FIG. 1, a Zenith gear pump 28 was provided to meter the adhesive melt through filter 30 and die 32. Excess adhesive was dumped through a dump valve (not shown) by the pressure generated in extruder 20. Coating die 32 deposited a desired thickness of adhesive onto web 34 which passed around a coating roll 36. The die 32 was a 6 inch (15.2 cm) wide die with a rubber wipe on the downstream side of the orifice. The coating roll 36 was a chromed steel roll which was temperature controlled by circulating heated water through its interior. An electron beam crosslinking station 38 was also provided.

An alternative equipment configuration useful in the practice of the invention is schematically shown in FIG. 2. In this configuration, a single screw extruder 23 is interposed between the twin screw extruder 21 and the filter 30. The single screw extruder 23 is used to generate enough pressure to push the adhesive through the filter 30. Additionally, the Zenith gear pump 28 was used donwnstream of the filter to meter the adhesive to die 33. The die 33 was a 24 inch (61 cm) wide contact extrusion die with a rotating steel rod on the downstream side of the die to smear the adhesive onto the web. The coating roll 37 was a temperature controlled steel roll having a rubber coating on it. The line speed of this configuration was automatically adjusted to achieve the desired coating thickness.

The screw designs employed in the Examples are shown schematically in FIGS. 3–4. The screw design of FIG. 3 contained 9 [zones] *sections*. The screw design of FIG. 4 contained 11 [zones] *sections*. [Zones] *Sections* 1, 3, 5, 7, 9 and 11 (if present) comprised conveying [zones] *sections*. [Zones] *Sections* 2, 4, 6, 8 and 10 (if present) comprised processing [zones] *sections*. [The dimensions of the various zones of each screw design are set out in Table II, as are the Examples in which each design were used.]

[TABLE II]

| **[** Screw Design Used in Ex's. | FIG. 3 1–13 | FIG. 3 14–16 | FIG. 3 17–18 | FIG. 4 19 |
|---|---|---|---|---|
| Diameter(mm) | 30 | 30 | 90 | 90 |
| Length(mm) | 1160 | 1160 | 3380 | 3382 |
| Zone 1(mm) | 186 | 186 | 1000 | 482 |
| Zone 2(mm) | 70 | 70 | 260 | 240 |
| Zone 3(mm) | 154 | 154 | 440 | 230 |
| Zone 4(mm) | 56 | 56 | 200 | 240 |
| Zone 5(mm) | 112 | 112 | 420 | 260 |
| Zone 6(mm) | 84 | 84 | 320 | 40 |
| Zone 7(mm) | 94 | 94 | 100 | 180 |
| Zone 8(mm) | 84 | 84 | 60 | 240 |
| Zone 9(mm) | 320 | 320 | 400 | 360 |
| Zone 10(mm) | — | — | — | 240 |
| Zone 11(mm) | — | — | — | 870 **]** |

EXAMPLE 1

Natsyn™ 2210 synthetic polyisoprene (available from Goodyear Tire and Rubber Co.) was pelletized using a Moriyama pelletizer and dusted with talc. This material was then fed to [Zone] *Section* 1 of the [twin screw] *screw, shown in FIG. 3 which was installed in the* extruder 20 *of FIG. 1,* at a rate of 68.0 g/min using a K-Tron loss-in-weight feeder which continuously monitored the weight of the material in the hopper. The elastomer and talc were transported from [Zone] *Section* 1 to [Zone] *Section* 2 [by] *of* the screw and was masticated in [Zone] *Section* 2. The elastomer was transported through [zones] *Section* 3 [and] *to Section* 4 where additional mastication occurred, to [zone] *Section* 5 where a sample of the elastomer was removed and found to have an inherent viscosity (IV) of 2.68 dl/g in toluene measured at a concentration of 0.15 grams per deciliter (g/dl).

Akron™ P-115 hydrogenated tackifier resin (available from Arakawa Chemical Industries, Ltd.) was dry blended with Irganox™ 1010 antioxidant (available from Ciba-Geigy Corp.) at a ratio of 49 parts by weight of resin to 1 part of antioxidant. This blend was fed to the extruder 20 [Zone] *Section* 5 through feed hopper 24 at a rate of 36.7 g/min. A K-Tron loss-in-weight feeder was used to monitor the weight in hopper 24. A total of 53 parts by weight of tackifier per 100 parts by weight of elastomer was fed to the extruder 20. The adhesive was transported through the remaining [zones] *sections* of the *screw and* extruder and delivered to metering pump 28. the metering pump 28 (See FIG. 1) was set to deliver 46.2 g/min of adhesive to the extrusion die 32 which coated the adhesive 4.75 inches wide (12 cm) on a creped paper masking tape backing moving at 30 ft/min (9.1 m/min) for an average coating thickness of 1.65 mils (41 m m). The melt temperature throughout the extruder was maintained at approximately 150° C. The coating roll 36 was maintained at a temperature of 90° C. The screw speed was maintained at 400 rpm. The resulting coated web comprised a PSA masking tape.

EXAMPLE 2

Example 1 was repeated except that after being coated onto the creped paper backing, the backing continued to move at 30 ft/min (9.1 m/min) and the adhesive layer was exposed in line to electron beam radiation at a dose of 6 MRads. The irradiated PSA masking tape had improved cohesive strength.

EXAMPLE 3

The equipment and conditions employed in Examples 1 were repeated in Example 3 with the following exceptions. Smoked sheet natural rubber (available from The Ore and Chemical Company, Inc.) was ground to particles approximately one quarter inch (0.63 cm) in diameter and dusted with talc. The rubber particles were fed to [Zone] *Section* 1 of the [twin screw] *screw, shown in FIG. 3 which was installed in the* extruder 20 *of FIG. 1*, at a rate of 68.0 g/min. The elastomer and talc were transported from [Zone] *Section* 1 to [Zone] *Section* 2. The elastomer was masticated there and was then transported through [zones] *Section* 3 [and] *to Section* 4, where additional mastication occurred, to [zone] *Section* 5 where a sample of the elastomer was removed and found to have an inherent viscosity of 4.7 dl/g in toluene measured at a concentration of 0.15 g/dl.

Piccolyte™ A-135 alpha-pinene tackifying resin (available from Hercules Chemical Company, Inc.) was dry blended with Irganox™ 1010 antioxidant at a mass ratio of 55:1 tackifier to antioxidant. A total of 55 parts by weight of tackifier per 100 parts by weight of elastomer was fed to the extruder 20. The blend of tackifier and antioxidant was fed to [Zone] *Section* 5 to the [extruder] *screw* at a rate of 38.1 g/min. The compounded adhesive was passed through the remaining [zones] *Sections* of the *screw and* extruder and was metered to the extrusion die at a rate of 46.2 g/min to coat 4.75 inches wide (12 cm) on a creped paper backing moving at 30 ft/min (9.1 m/min). The melt temperature of the adhesive was maintained approximately 165° C. throughout the extruder. The resulting adhesive tape was useful as a masking tape.

EXAMPLE 4

Example 3 was repeated except the adhesive was extruded at a rate of 46.2 g/min to coat 4.75 inches wide (12 cm) onto a 1.5 mil (37 $\mu$m) thick poly(ethylene terephthalate) backing moving at 30 ft/min (9.1 m/min). The resulting coated web continued to move at a speed of 30 ft/min (9.1 m/min) and the adhesive layer was then exposed to electron beam radiation at a dose of 5 MRads. Both the unirradiated and the irradiated PSA tapes were useful as a protective tape. The irradiated tape had improved cohesive strength.

EXAMPLE 5

Example 3 was repeated except that, after being coated, the PSA tape continued to move at a speed of 30 ft/min (9.1 m/min) and the adhesive layer was exposed in line to electron beam radiation at a dose of 3 MRads. The resulting irradiated tape had improved cohesive strength.

EXAMPLE 6

Example 1 was repeated with the following changes. Pelletized Natsyn™ 2210 and ground smoked sheet natural rubber were fed to [Zone] *Section* 1 of the [twin screw compounder] *screw, shown in FIG. 3 which was installed in the extruder* 20 *of FIG. 1,* using separate feed hoppers. The Natsyn™ 2210 was delivered at a rate of 34.2 g/min. The natural rubber was added at a rate of 34.0 g/min. The elastomers and talcs were transported from [Zone] *Section* 1 to [Zone] *Section* 2 where the elastomers were masticated.

Piccolyte™ A-135 tackifier was pre-blended with Irganox™ 1010 antioxidant at a mass ratio of 55:1 tackifier to antioxidant and the blend was fed to [Zone] *Section* 5 of the [extruder] *screw* at a rate of 38.1 g/min. A total of 55 parts by weight of the tackifier per 100 parts by weight of elastomer was fed to the extruder 20. The adhesive was transported through the remaining [zones] *sections* of the *screw and* extruder and was delivered to the extrusion die at a rate of 46.2 g/min. It was coated onto a 1.5 mil (38 $\mu$m) polyester film at a width of 4.75 inches (12 cm) using a line speed of 30 ft/min (9.1 m/min) to form an adhesive coating 1.6 mils (40 $\mu$m thick). The melt temperature was maintained at approximately 165° C. throughout the extruder. The resulting PSA tape was useful as a protective tape.

EXAMPLE 7

Example 6 was repeated except that, after being coated, the PSA tape continued to move at a rate of 30 ft/min (9.1 m/min) and the adhesive layer was exposed in line to electron beam radiation at a dose of 6 MRads. The resulting PSA tape had improved cohesive strength.

EXAMPLE 8

Example 1 was repeated with the following changes. A controlled Mooney viscosity natural rubber (SMR CV60) (available from The Ore and Chemical Company, Inc.) was pelletized using the Moriyama pelletizer and the pellets dusted with talc. Similarly, Budene™ 1207 cis-polybutadiene (available from Goodyear Tire & Rubber Company) was pelletized and talc coated. The two elastomers were fed to [Zone] *Section* 1 of the [twin screw compounder] *screw, shown in FIG. 3 which was installed in the extruder* 20 *of FIG. 1,* using separate feed hoppers. The CV60 natural rubber was delivered at a rate of 31.9 g/min. The Budene™ 1207 was fed at 36.5 g/min. The elastomers and talcs were transported from [Zone] *Section* 1 to [Zone] *Section* 2 where the elastomers were masticated.

Pentalyn™ rosin ester tackifier (available from Hercules Chemical Company, Inc.) was dry blended with Irganox™ 1010 antioxidant at a mass ratio of 65.7:1 tackifier to antioxidant. The blend was fed to [Zone] *Section* 5 of the [twin] screw [compounder] at a rate of 45.6 g/min. A total of 66 parts by weight tackifier per 100 parts by weight of elastomer was fed to the extruder [10] *20*. The adhesive was transported through the remaining [zone] *section* of the *screw and* extruder and metered to the extrusion die at a rate of 46.1 g/min. The adhesive was coated on a creped paper masking tape backing at a coating thickness of 1.6 mils (40 μm). The web was running at 30 ft/min (9.1 m/min) and was coated 4.75 inches (12 cm) wide. The melt temperature was maintained at approximately 150° C. throughout the extruder. The resulting adhesive tape was useful as a PSA masking tape.

EXAMPLE 9

Example 8 was repeated except that, after being coated, the PSA tape continued to move at a rate of 30 ft/min (9.1 m/min) and the adhesive layer was exposed in line to electron beam radiation at a dose of 4 MRads. The irradiated PSA tape had improved cohesive strength.

EXAMPLE 10

Example 1 was repeated with the following changes. Smoked sheet natural rubber ground as described in Example 3 was used as well as Ameripol/Synpol 1011A styrene-butadiene random copolymer rubber (SBR) (available from Ameripol/Synpol Company). The SBR was pelletized and talc coated using the Moriyama system. The two rubbers were both fed to [Zone] *Section* 1 of the [twin] screw [compounder] using separate feed hoppers. The natural rubber was fed at a rate of 34.0 g/min. The SBR was fed at 34.2 g/min. The elastomers and talcs were transported from [Zone] *Section* 1 to [Zone] *Section* 2 where the elastomers were masticated.

Escorez™ 1304 petroleum derived tackifying resin (available from Exxon Research & Engineering Co.) was dry blended with Irganox™ 1010 antioxidant at a mass ratio of 50:1 tackifier to antioxidant. The blend was fed to [Zone] *Section* 5 of the [twin] screw [compounder] at a rate of 34.9 g/min. A total of 50 parts by weight of tackifier per 100 parts by weight of elastomer was fed to the extruder 20. The adhesive was transported through the remainder of the *screw and* extruder and was melted to the extrusion die at a rate of 46.1 g/min. The adhesive was coated onto a creped paper masking tape backing to 4.75 inches wide (12 cm) at 30 ft/min (9.1 m/min) resulting in an average adhesive thickness of 1.6 mils (40 μm). The melt temperature was maintained at approximately 140° C. throughout the extruder. The resulting adhesive tape was useful as a PSA masking tape.

EXAMPLE 11

Example 10 was repeated except that, after being coated, the PSA tape continued to move at a rate of 30 ft/min (9.1 m/min) and the adhesive layer was exposed in line to electron beam radiation at a dose of 6 MRads. The irradiated PSA tape has improved cohesive strength.

EXAMPLE 12

Example 1 was repeated with the following exceptions. Controlled Mooney viscosity natural rubber (CV60) was pelletized using the Moriyama pelletizer and dusted with talc. The elastomer was added to [Zone] *Section* 1 of the *screw, shown in FIG. 3 which was installed in the* extruder *20 of FIG. 1,* at a rate of 68.4 g/min. The elastomer and talc were transported from [Zone] *Section* 1 to [Zone] *Section* 2 and were masticated in [Zone] *Section* 2. The elastomer and talc were transported through [zones] *Section* 3 [and] *to Section* 4, where additional mastication occurred, to [Zone] *Section* 5 where a sample of the elastomer was removed and found to have an IV of 3.5 dl/g in toluene when measured at a concentration of 0.15 g/dl.

Escorez™ 1304 tackifier resin was dry blended with Irganox™ 1010 antioxidant and zinc oxide in the following amounts:

| Component | Wt. % |
|---|---|
| Escorez ™ 1304 | 78.2 |
| Zinc Oxide | 20.8 |
| Irganox ™ 1010 | 1.0 |

This blend was added to [Zone] *Section* 5 of the [twin] screw [compounder] at a rate of 70.6 g/min. A total of 81 parts by weight of tackifier per 100 parts by weight of elastomer was fed to the extruder 20. White mineral oil was added to the extruder [Zone] *Section* 7 through an injection port (not shown). A Zenith gear pump delivered the oil to the extruder from an open stainless steel container. The oil was delivered by a gear pump at a rate of 8.34 g/min. A total of 12 parts by weight of oil per 100 parts by weight of elastomer were fed to the extruder. The resulting adhesive contained 5.6% oil by weight. The adhesive passed through the remaining [zones] *Sections* of the *screw and* extruder and was metered to the extrusion die at a rate of 104 g/min. It was coated 4.75 inches wide (12 cm) onto a cotton cloth backing moving at 30 ft/min (9.1 m/min) to form an adhesive coating averaging 3.6 mils (91 μm) thick. The melt temperature was maintained at approximately 165° C. throughout the extruder. The resulting adhesive tape was useful as a medical tape. The tape, including the adhesive layer, was porous. Such porosity allows perspiration and skin oil to pass through the tape.

EXAMPLE 13

Example 12 was repeated except that, after being coated, the PSA tape continued to move at a rate of 30 ft/min and the adhesive layer was exposed in line to electron beam radiation at a dose of 2 MRads using an accelerating potential of 175 kV. The irradiated PSA tape had improved cohesive strength. The adhesive layer retained is porosity.

EXAMPLE 14

Ribbed smoked sheet and natural rubber was ground to particles approximately one quarter inch (0.63 cm) in diameter and dusted with talc. This was fed to [Zone] *Section* 1 of the [twin screw] *screw, shown in FIG. 3 which was installed in the* extruder *20 of FIG. 1,* at a rate of 68.0 g/min. The temperature in [zones] *Sections* 2 through 4 was maintained at 168° C. After [zone] *Section* 5 the melt temperature was maintained at 110° C. Air was injected into and vented from [zone] *Section* 3 of the extruder. The pressure and flow rate were adjusted to achieve an IV of the rubber (as measured on samples removed at [Zone] *Section* 5) of 2.1 dl/g in toluene when measured at a concentration of 0.15 g/dl. The extruder speed was 320 rpm. Escorez™ 1310 tackifier was blended with Bismaleimide M-20 available from Mitsui Petrochemical at a ratio of 65 parts of Escorez™ 1310 to 1 part of M-20 by weight. This mixture was then added to [zone] *Section* 5 at a rate of 44.9 g/min. A total of 65 parts by weight of tackifier per 100 parts of elastomer were added. Titanium dioxide was added to [zone] *Section* 7 at a rate of 6.1 g/min. Liquid tricresyl phosphate was added to [zone] *Section* 9 at a rate of 2.0 g/min and liquid triphenyl phosphite was added to the same [zone] *Section* at a rate of 0.3 g/min. This resulted in a total liquid content of 2% of the adhesive. The compounded adhesive was coated on a creped paper masking tape backing using a die with a flexible steel blade. The web speed was 60 ft/min ((18.2 m/min) and adhesive was coated at a thickness of 1.5 mils (38 μm). The adhesive layer of the moving webs was irradiated by exposure to an electron beam operating at an accelerating potential of 165 Kv with a dose of 2 MRads. The resulting irradiated PSA tape was useful as a masking tape.

EXAMPLE 15

Controlled viscosity natural rubber (SMR CV 60) was pelletized with the Moriyama pelletizer and fed to [zone] *Section* 1 of the *screw, shown in FIG. 3 which was installed in the* extruder *20 of FIG. 1,* 68.0 g/min. The extruder speed was set at 470 rpm. The air pressure and flow rate in [zone] *Section* 3 was regulated to achieve an IV of the rubber (as measured on a sample removed at [zone] *Section* 5) of 1.5 dl/g when measured at a concentration of 0.15 g/dl. The temperature in [zones] *Sections* 2 through 4 was maintained at 195° C. After [zone] *Section* 5 the melt temperature was maintained at 100° C. Wingtack Plus tackifying resin from Goodyear was blended with Irganox™ 1010 antioxidant from Ciba-Geigy at a ratio of 40.1 parts wingtack Plus to 1.3 parts Irganox™ 1010 by weight. This blend was added to [zone] *Section* 5 at a rate of 50.5 g/min. A total of 72 parts by weight of tackifier per 100 parts of elastomer were added. The compounded adhesive was coated onto a 2 mil (51 μm) biaxially oriented polypropylene film at a coating thickness of 1.5 mils (38 μm). The web was run at a speed of 30 ft/min. (9.1 m/min). The resulting product was useful as a PSA packaging tape.

EXAMPLE 16

Example 15 was repeated except that, after being coated, the tape continued to move at a rate of 30 ft/min (9.1 m/min) and the adhesive layer was irradiated in line by exposure to an electron beam at a dose of 9 MRads. The resulting PSA tape had increased cohesive strength.

EXAMPLE 17

CV60 natural rubber was ground and dusted with talc. The rubber was added to [Zone] *Section* 1 of the *screw, shown in FIG. 3 which was installed in the* extruder *21 of FIG. 2,* at a rate of 116 lb/hr. (52.7 kg/hr). The extruder screw operated at 225 rpm. The elastomer and talc were transported from [Zone] *Section* 1 to [Zone] *Section* 2 and were masticated in [Zone] *Section* 2. Escorez™ 1304 tackifier was added at a rate of 34.8 lb./hr (15.8 kg/hr) to [zone] *Section* 3. Additional Escorez™ 1034 was added at a rate of 59.2 lb/hr (26.9 kg/hr) to [zone] *Section* 5. Irganoz™ 1010 was added with the tackifier stream to [zone] *Section* 5 at a rate of 1.2 lb/hr. (0.55 kg/hr). Zinc oxide was also fed to [Zone] *Section* 5 at a rate of 24.9 lb/hr (11.3 kg/hr). A total of 81 parts by weight of tackifier and 21 parts by weight of zinc oxide per 100 parts by weight of elastomer were fed to the extruder. White mineral oil was added to [Zone] *Section* 7 at 13.9 lb/hr (6.3 kg/hr). The resulting adhesive contained 5.6% oil by weight. The adhesive was metered to a 24 inch (61 cm) wide contact extrusion die with a rotating steel rod on the downstream side of the die gap to smear the adhesive onto the web. The adhesive was applied at a rate of 250 lb/hr (113.6 kg/hr) and coated onto a cotton cloth backing 24 inches (61 cm) wide. The line speed was automatically adjusted to achieve an adhesive coating thickness of 3.7 mils (94 μm). The melt temperature was maintained at approximately 130° C. throughout the extruder. The resulting PSA tape was useful as a porous medical tape.

EXAMPLE 18

Example 17 was repeated except that, after being coated, the PSA tape continued to move at a rate that was automatically adjusted to maintain the adhesive coating thickness at 3.7 mils (94 μm). The moving adhesive layer was exposed in line to electron beam radiation at a dose of 5 MRads. The irradiated PSA tape retained its porosity and had improved cohesive strength.

EXAMPLE 19

Ground ribbed smoked sheet natural rubber was added to [zone] *Section* 1 of the [twin screw compounder] *screw, shown in FIG. 4 which was installed in the extruder 21 of FIG. 2,* at a rate of 79.35 lb/hr. (36 kg/hr). Air was injected into and bled from [zone] *Section* 3. The air pressure and flow rate were regulated to achieve an IV of the rubber (as measured on a sample removed at [zone] *Section* 7) of 2.0 dl/g. in toluene when measured at a concentration of 0.15 dl/g. The screw speed was 150 rpm and the extruder wall temperature in [zones] *Sections* 2 through 5 was maintained at 200° F. (93)° C.

Escorez™ 1304 tackifying resin was added to [zone] *Section* 9 at a rate of 68.2 lb/hr (31 kg/hr). Titanium dioxide was added to [zone] *Section* 9 at a rate of 1.6 lb/hr (0.7 kg/hr). Irganox™ 1010 antioxidant was added to [zone] *Section* 9 at a rate of 0.8 lb/hr (0.36 kg/hr). The extruder wall temperatures in [zones] *Sections* 7 through 11 were maintained at 250° F. (121° C.). The pumping extruder and transport lines were also maintained at 250° F. (121° C.). The adhesive was metered to the die at a rate of 150 lb/hr (68.1 kg/hr) and coated onto a creped paper masking tape backing. The line speed was adjusted automatically to achieve a coating thickness of 2 mils (51 μm). The adhesive layer of the moving web was irradiated in line by exposure to an electron beam radiation at a dose of 4 MRads. The PSA tape was useful as a masking tape.

EXAMPLE 20

CV60 natural rubber was pelletized with a Moriyama pelletizer and the pellets dusted with talc. The pelletized CV60 was then fed to [Zone] *Section* 1 of the *screw, shown in FIG. 3 which was installed in the* extruder *20 of FIG. 1,* at a rate of 68.0 g/min. The elastomer was transported from [Zone] *Section* 1 to [Zone] *Section* 2 where the elastomer was masticated.

Escorez™ 1304 tackifier resin was dry blended with Irganox™ 1010 antioxidant and Celogen™OT in the following amounts:

| Component | Wt. % |
|---|---|
| Escorez ™ 1304 | 96.7 |
| Irganox ™ 1010 | 1.1 |
| Celogen ™ | 2.2 |

This blend was added to [Zone] *Section* 5 of the [twin] screw [compounder] at a rate of 63.2 g/min. The adhesive was transported through the remainder of the *screw and* extruder and was metered to the extrusion die at a rate of 46.1 g/min. The adhesive was coated onto a creped paper masking tape backing to 4.75 inches wide (12 cm) at 30 ft/min (9.1 m/min) resulting in an average adhesive thickness of 1.6 mils (40 microns). The melt temperature of the compounded adhesive was maintained below 140° C. throughout the extruder. The resulting PSA tape continued to move at a rate of 30 ft/min (9.1 m/min) and the adhesive layer was exposed in line to electron beam radiation at a dose of 3 MRads.

A portion of the resultant adhesive tape was wound into a roll and heated at 150° C. (300° F.) for 1 minute to decompose the Celogen™OT. Samples of the foamed and unfoamed adhesive tapes were then tested for their quick grab characteristics using a Rolling Ball Tack (RBT) test. This test was performed as follows:

RBT: The RBT test is described in Test Methods for Pressure-sensitive Tapes, 10th Edition, Pressure-Sensitive Tape Council, 401, North Michigan Avenue, Chicago, Ill. 60611-4267. The test is described in this publication as PSTC-6. This test measures the distance a small steel ball travels across a horizontally positioned sample of the tape adhesive surface after being accelerated down an inclined plane from a fixed height; the shorter the bonding time of the adhesive surface, the more quickly the steel ball will decelerate, and the shorter the distance the ball travels across the tape surface before coming to a stop. Tapes with better conformability and shorter bonding times will thus exhibit lower Rolling Ball Tack values. This test was performed at two temperature conditions with a 7/16 (11.1 mm) diameter-7 gm ball.

These results were:

| | Temperature | Foamed | Unfoamed |
|---|---|---|---|
| RBT | 5.6° C. (41° F.) | 64.4 mm | 79.2 mm |
| | 22.2° C. (72° F.) | 8 mm | 24.5 mm |

It can be seen that foamed tapes exhibit shorter RBT values than their unfoamed counterparts. This reflects the improved conformability the foaming process imparts to the adhesive surface.

EXAMPLE 21

CV60 natural rubber and Ameripol/Synpol$^{SM}$ 1011A styrene-butadiene were pelletized with a Moriyama pelletizer and dusted with talc. The two rubbers were both fed to [Zone] *Section* 1 of the [twin screw compounder] *screw, shown in FIG. 4 which was installed in the extruder 21 of FIG. 2,* using separate feeder hoppers: CV60 at 37.4 g/min, styrene-butadiene at 30.6 g/min. The elastomers and talc were transported from [Zone] *Section* 1 to [Zone] *Section* 2 where the elastomers were masticated.

Escorez™ 1304 tackifier resin was dry blended with Irganox™ 1010 antioxidant, titanium dioxide coloring agent, and Celogen™OT in the following amounts:

| Component | Wt. % |
|---|---|
| Escorez ™ 1304 | 96.7 |
| Irganox ™ 1010 | 1.1 |
| Titanium ™ Dioxide | 3.3 |
| Celogen ™ | 2.2 |

This blend was added to [Zone] *Section* 5 of the [twin] screw [compounder] at a rate of 40.8 g/min. The adhesive was transported through the remainder of the *screw and* extruder and was metered to the extrusion die at a rate of 46.1 g/min. The adhesive was coated onto a creped paper masking tape backing to 4.75 inches wide (12 cm) and 30 ft/min (9.1 m/min) resulting in an average adhesive thickness of 1.6 mils (40 microns). The melt temperature of the compounded adhesive was maintained below 140° C. throughout the extruder. The PSA tape continued to move at a rate of 30 ft/min (9.1 m/min) and the adhesive layer was exposed in line to electron beam radiation at a dose of 4 MRads.

A portion of the resultant adhesive tape was wound into a roll and heated at 150° C. (300° F.) for 1 minute to decompose the Celogen™OT. Samples of the foamed and unfoamed tapes were then tested for RBT value. These results are given below:

| | Temperature | Foamed | Unfoamed |
|---|---|---|---|
| RBT | 5.6° C. (48° F.) | 317 mm | >400 mm |
| | 22.2° C. (72° F.) | 10.3 mm | 21 mm |

EXAMPLE 22

The adhesive as described in Example 20 was coated onto creped paper masking tape backing and electron beam cured in line. A separate portion of the tape was coated as described in Example 20 but was not electron beam cured in line. The resulting roll of uncured tape was then unwound and run between two electrically heated plates at 15 ft/min (4.6 m/min) so that the tape was heated to 230° F. (160° C.) to foam the adhesive. The foamed tape then continued and was exposed to electron beam radiation at a [does] *dose* of 4 MRads. Samples of the foamed and unfoamed tape were then tested for RBT value. The results are given below:

| | Temperature | Foamed | Unfoamed |
|---|---|---|---|
| RBT | 22.2° C. (72° F.) | 8 mm | 24.5 mm |

EXAMPLE 23

The adhesive as described in Example 21 was coated onto creped paper masking tape backing and electron beam cured at 4 MRads. A separate portion of the tape was not electron beam cured in line. The resulting roll of uncured tape was then unwound and run between two electrically heated plates at 15 ft/min (4.6 m/min) so that the tape was heated to 230° F. (160° C.) to foam the adhesive. The foamed tape was then continued at 15 ft/min (4.6 m/min) and the adhesive layer was exposed to electron beam radiation at a dose of 4 MRads. Samples of the foamed and unfoamed tapes were then tested for RBT value. The results are given below:

| | Temperature | Foamed | Unfoamed |
|---|---|---|---|
| RBT | 5.6° C. (48° F.) | 133 mm | >400 mm |
| | 22.2° C. (72° F.) | 11 mm | 15 mm |

Although the present invention has been described with respect to specific embodiments, the invention is not intended to be limited to those embodiments. Rather, the invention is defined by the claims and equivalents thereof.

We claim:

1. A solventless hot melt process for preparing a non-thermosettable pressure sensitive adhesive from a tackified non-thermoplastic hydrocarbon elastomer, said process occurring in a continuous compounding device which has a sequence of alternating conveying and processing zones, said processing zones being capable of masticating and mixing, said process comprising the steps of:

(a) feeding said non-thermoplastic hydrocarbon elastomer to a first conveying zone to transport said elastomer to a first processing zone;

(b) masticating said elastomer in the first processing zone for a time sufficient to render it capable of (i) receiving adjuvants, and (ii) being extruded;

(*c*) *adding a tackifier to said device;*

[(c)] (*d*) transporting *at least* said masticated elastomer from the first processing zone to [a second conveying zone, feeding tackifier to said masticated elastomer in the second conveying zone and transporting the combination of the masticated elastomer and tackifier to] a second processing zone;

[(d)] (*e*) forming a blend of said masticated elastomer and tackifier [in the second processing zone]; and

[(e)] (*f*) discharging said blend from said continuous compounding device;

wherein said blend comprises a pressure sensitive adhesive which contains less than [about] 8.5 percent by weight of a plasticizing aid.

2. A process according to claim 1 wherein the first said processing zone comprises at least two *processing* sections separated from each other by a transporting section.

3. A process according to claim 2 wherein said elastomer is masticated in each of said separate sections.

4. A process according to claim 2 wherein a gas containing available oxygen is injected into said transporting section.

5. A process according to claim 1 wherein said blend is discharged onto a moving web to form a thin film thereof.

6. A solvent free hot melt process for the mastication of a non-thermoplastic hydrocarbon elastomer, the compounding of said elastomer into a non-thermosettable pressure-sensitive adhesive composition containing less than [10%] *8.5%* by weight of a plasticizing aid, and the coating of said pressure-sensitive adhesive onto a sheet comprising the steps of:

a) operating a continuous compounding device at a desired speed, said device having a twin screw therein which has a sequence of conveying and processing zones which alternate with one another[: and]*;* b) feeding said elastomer to a first conveying zone of said device at a controlled rate so that said elastomer does not completely fill said first conveying zone; [and]

c) transporting *at least* said elastomer to a first processing zone of said device so that said elastomer essentially fills said first processing zone; [and]

d) masticating said elastomer in said first processing zone [for a time sufficient to receive a subsequently added tackifier and form a blend thereof; said masticating occurring] in the absence of a quantify of a material which would prevent effective reduction of the molecular weight of said elastomer; [and]

e) transporting *at least* said masticated elastomer to a second conveying zone so that it does not completely fill said second conveying zone [and feeding said tackifier to said second conveying zone at a controlled rate to form a mixture of masticated elastomer and tackifier and passing said mixture]; [and]

f) *adding a tackifier to said device to form a mixture;* g) transporting said mixture to a second processing zone so as to essentially fill said second processing zone with said mixture and forming a blend of said mixture in said second processing zone; and

*h*) discharging said blend from said device.

7. A process according to claim 6 wherein said blend is discharged from said continuous compounding device as a thin film onto a moving web and exposed to radiation[,].

8. A process according to claim 7 wherein said radiation is selected from the group consisting of electron beam radiation and ultraviolet light.

9. A process according to claim 6 wherein said elastomer is selected from the group consisting of natural rubber, butyl rubber, synthetic polyisoprene, ethylene-propylene rubber, ethylene-propylene-diene monomer rubber, polybutadiene, polyisobutylene, poly(alpha-olefin), and styrene-butadiene rubber.

10. A process according to claim 6 wherein said tackifier is present in an amount of from 10 to 200 parts by weight per 100 parts by weight of said elastomer.

11. A process according to claim 6 wherein said tackifier is selected from the group consisting of rosin, rosin derivatives, hydrocarbon resins, aromatic hydrocarbon resins, aliphatic *hydrocarbon resins, and terpene resins*.

12. A solvent free hot melt process for the mastication of a high molecular weight non-thermoplastic hydrocarbon elastomer and the compounding of said elastomer into a non-thermosettable pressure-sensitive adhesive, which process employs less than [10%] *8.5%* by weight of said elastomer of a plasticizing aid comprising the steps of:

a) providing a continuous compounding device having a twin screw therein which has a sequence of conveying and processing zones which alternate with one another; [and]

b) feeding said high molecular weight elastomer to a first conveying zone of said device at a controlled rate so that said elastomer does not completely fill said first conveying zone; [and]

c) transporting said elastomer to a first processing zone of said device so that said elastomer essentially fills said first processing zone; [and]

d) masticating said elastomer in said first processing zone in the absence of any significant amount of plasticizing aid [for a time sufficient to receive a subsequently added tackifier and form a blend thereof]; and e) *adding a tackifier to said device;*

[e)] *f*) transporting *at least* said masticated elastomer to a second conveying zone so that it does not completely fill said second conveying zone [and feeding said tackifier to said second conveying zone at a controlled rate to form a mixture of masticated elastomer and tackifier and passing said mixture]; [and]

[f)] *g*) transporting said [mixture] *masticated elastomer and said tackifier* to a second processing zone so as to essentially fill said second processing zone with said *masticated elastomer and said tackifier to form a* mixture *thereof* and forming a blend of said mixture in said second processing zone; and

[g)] *h*) discharging said blend from said device.

13. A process according to claim 12 wherein said blend is discharged from said device onto a moving web to form a layer of a pressure sensitive adhesive on said moving web.

14. The process of claim 13 wherein the adhesive layer on said moving web is exposed to radiation.

15. A process according to claim 14 wherein said radiation is selected from the group consisting of electron beam radiation and ultraviolet light.

16. A process according to claim 13 comprising the further step of applying a release material to the surface of said web opposite the surface ultimately bearing said adhesive film.

17. A process according to claim 12 comprising the further step of adding adjuvants to said elastomer.

18. A process according to claim 17 wherein said adjuvants are added after said elastomer has been masticated.

19. A process according to claim 18 wherein said adjuvants are added after said blend has been formed.

20. A process according to claim 17 wherein said adjuvants are added before said elastomer is masticated.

21. A process according to claim 20 wherein said adjuvants are selected from the group consisting of antioxidants, inorganic fillers, pigments, odorants, and radiation enhancers.

22. The process of claim 12 wherein said first processing zone has a first processing section, a second processing section and a transporting section between the two.

23. The process of claim 22 wherein air is injected into said transporting section.

24. A process according to claim 12 which employs a combination of at least two of said elastomers.

25. A non-thermosettable pressure sensitive adhesive tape comprising (i) a tackified non-thermoplastic elastomer and (ii) less than [10%] *8.5%* by weight of a plasticizing aid; wherein said tape has been prepared by a solventless hot melt process in a continuous compounding device which has a sequence of alternating conveying and processing zones, said processing zones being capable of masticating and mixing, which process comprises:

(a) feeding said non-thermoplastic hydrocarbon elastomer to a first conveying zone to transport said elastomer to a fist processing zone;

(b) masticating said elastomer without the presence of any significant amount of a plasticizing aid in the first processing zone for a time sufficient to render it capable of (i) receiving adjuvants, and (ii) being extruded;

(*c*) *adding a tackifier to said device;*

[(c)] (*d*) transporting *at least* said masticated elastomer from the first processing zone to a second conveying zone[, feeding tackifier to said masticated elastomer in the second conveying zone and transporting the combination of the masticated elastomer and tackifier to a second processing zone];

[(d)] (*e*) forming a blend of said masticated elastomer and tackifier [in the second processing zone]; and

[(e)] (*f*) discharging said blend onto a moving web to form said tape.

26. A porous pressure sensitive adhesive tape according to claim 25.

27. A process according to claim 1 wherein said elastomer is masticated in the absence of said plasticizing aid.

28. A process according to claim 6 wherein said elastomer is masticated in the absence of said plasticizing aid.

29. A process according to claim 12 wherein said elastomer is masticated in the absence of said plasticizing aid.

30. A solvent free hot melt process for the mastication of a non-thermoplastic hydrocarbon elastomer, the compounding of said elastomer into a non-thermosettable tackified pressure-sensitive adhesive composition, and the coating of said pressure-sensitive adhesive as a film comprising the steps of:

a) operating a continuous compounding device at a desired speed, said device having a sequence of conveying and processing zones which alternate with one another, [and]

b) feeding said elastomer to a first conveying zone of said device at a controlled rate so that said elastomer does not completely fill said first conveying zone; [and]

c) transporting said elastomer to a first processing zone of said device so that said elastomer especially fills said first processing zone; [and]

d) masticating said elastomer in said first processing zone [for a time sufficient to receive a subsequently added tackifier and form a blend thereof]; [and]

*e*) *adding a tackifier to said device;*

[e)] *f*) transporting *at least* said masticated elastomer to a second conveying zone so that it does not completely fill said second conveyor zone [and feeding said tackifier to said second conveying zone at a controlled rate to form a mixture of masticated elastomer and tackifier and passing said mixture]; [and]

[f)] *g*) transporting said [mixture] *masticated elastomer and said tackifier* to a second processing zone so as to essentially fill said second processing zone with [said] *a* mixture *thereof* and forming a blend of said mixture in said second processing zone; and

[g)] *h*) discharging said blend from said device as a pressure sensitive adhesive film containing less than [10%] *8.5%* by weight of a plasticizing aid.

*31. A solventless hot melt process for preparing a non-thermosettable pressure sensitive adhesive from a tackified non-thermoplastic hydrocarbon elastomer, the process comprising the steps of:*

*a) feeding the non-thermoplastic hydrocarbon elastomer to a continuous compounding device which has a sequence of alternating conveying and processing zones, the processing zones being capable of masticating and mixing, and masticating the elastomer in the first processing zone for a time sufficient to render it capable of (i) receiving adjuvants, and (ii) being extruded;*

*b) feeding a tackifier for the non-thermoplastic hydrocarbon elastomer to the continuous compounding device and mixing to form a blend of the ingredients; and*

*c) discharging the blend from the continuous compounding device in the form of a pressure sensitive adhesive, wherein the adhesive is compounded in the presence of from 0 to less than 8.5% by weight of plasticizing aid with respect to adhesive.*

*32. A process according to claim 31, wherein the compounding device comprises a first processing zone having at least two sections separated from each other by a transporting section.*

*33. A process according to claim 32 wherein a gas containing available oxygen is injected into the transporting section.*

*34. A process according to claim 31 wherein the blend is discharged from the continuous compounding device as a thin film onto a moving web and exposed to ionizing radiation.*

*35. A process according to claim 31 comprising the steps of:*

*a) providing a continuous compounding device having a twin screw therein which has a sequence of conveying and processing zones which alternate with one another;*

*b) feeding the elastomer to a first conveying zone of the device at a controlled rate so that the elastomer does not completely fill the first conveying zone;*

*c) transporting the elastomer to a first processing zone of the device so that the elastomer essentially fills the first processing zone;*

*d) masticating the elastomer in the first processing zone in the absence of any significant amount of plasticizing aid for a time sufficient to receive a subsequently added tackifier and from a blend thereof;*

*e) transporting the masticated elastomer to a second conveying zone so that it does not completely fill the second conveying zone and feeding the tackifier to the second conveying zone a controlled rate to from a mixture of masticated elastomer and tackifier; and*

*f) discharging the blend from the device.*

*36. A process according to claim 31 wherein said non-thermoplastic hydrocarbon elastomer has a viscosity average molecular weight of at least 250,000.*

*37. A process according to claim 31 wherein the mastication of the non-thermoplastic hydrocarbon elastomer in the first processing zone occurs in the absence of a quantity of material that would prevent the effective reduction of the molecular weight of the elastomer.*

*38. A process according to claim 34 comprising the further step of applying a release material to the surface of the web opposite the surface ultimately bearing the adhesive film.*

*39. A process according to claim 31 employing a combination of at least two non-thermoplastic hydrocarbon elastomers.*

*40. A process according to claim 31 wherein the elastomer is masticated in the absence of a plasticizing aid.*

* * * * *

UNITED STATES PATENT AND TRADEMARK OFFICE

CERTIFICATE OF CORRECTION

PATENT NO.: Re 36,855

DATED: 9/5/2000

INVENTOR(S): Timothy D. Bredahl, Harold W. Leverty, Robert L. Smith, Richard E. Bennett, David J. Yarusso, Daniel C. Munson, and George E. Cox It is certified that error appears in the above-identified patent and that said Letters Patent is hereby corrected as shown below:

Column 24, line 2, "from" should read --form--.

Signed and Sealed this

Seventeenth Day of April, 2001

*Attest:*

Nicholas P. Godici

NICHOLAS P. GODICI

*Attesting Officer*

*Acting Director of the United States Patent and Trademark Office*